United States Patent
Oono et al.

(10) Patent No.: US 9,625,757 B2
(45) Date of Patent: Apr. 18, 2017

(54) LIQUID CRYSTAL DISPLAY DEVICE

(71) Applicant: Japan Display Inc., Minato-ku (JP)

(72) Inventors: Atsuko Oono, Tokyo (JP); Arihiro Takeda, Tokyo (JP); Jin Hirosawa, Tokyo (JP); Satoru Kawasaki, Tokyo (JP); Yuji Maede, Tokyo (JP); Saori Sugiyama, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 14/626,212

(22) Filed: Feb. 19, 2015

(65) Prior Publication Data
US 2015/0234243 A1    Aug. 20, 2015

(30) Foreign Application Priority Data
Feb. 20, 2014 (JP) ................. 2014-030543

(51) Int. Cl.
*G02F 1/1335* (2006.01)
*G02F 1/1343* (2006.01)

(52) U.S. Cl.
CPC .. *G02F 1/133514* (2013.01); *G02F 1/134363* (2013.01); *G02F 2001/134372* (2013.01); *G02F 2201/52* (2013.01)

(58) Field of Classification Search
CPC .............................................. G02F 1/133514
See application file for complete search history.

(56) References Cited

U.S. PATENT DOCUMENTS

| | | | | |
|---|---|---|---|---|
| 2008/0049047 A1* | 2/2008 | Credelle | ............. | G09G 3/2003 345/690 |
| 2009/0109358 A1* | 4/2009 | Tanaka | ............. | G02F 1/134363 349/38 |
| 2012/0127148 A1* | 5/2012 | Lee | ................... | G02F 1/134363 345/212 |
| 2014/0211133 A1* | 7/2014 | Huh | ................. | G02F 1/133512 349/104 |

FOREIGN PATENT DOCUMENTS

JP        2003 57670       2/2003

* cited by examiner

*Primary Examiner* — Paisley L Arendt
*Assistant Examiner* — Edmond Lau
(74) *Attorney, Agent, or Firm* — Oblon, McClelland, Maier & Neustadt, L.L.P.

(57) ABSTRACT

According to one embodiment, a liquid crystal display device, include a first substrate includes a first pixel electrode including m first strip electrodes, a second pixel electrode including m second strip electrodes, a third pixel electrode including n third strip electrodes, a fourth pixel electrode including m fourth strip electrodes, a fifth pixel electrode including m fifth strip electrodes, and a sixth pixel electrode including n sixth strip electrodes, m and n being positive integers and unequal to each other.

9 Claims, 7 Drawing Sheets

LIQUID CRYSTAL DISPLAY DEVICE

CROSS-REFERENCE TO RELATED APPLICATIONS

This application is based upon and claims the benefit of priority from Japanese Patent Application No. 2014-030543, filed Feb. 20, 2014, the entire contents of which are incorporated herein by reference.

FIELD

Embodiments described herein relate generally to a liquid crystal display device.

BACKGROUND

Recently, a liquid crystal display device using a lateral electric field (including a fringe field) such as an in-plane switching (IPS) mode or a fringe field switching (FFS) mode has been put into practical use. Such a liquid crystal display device of the lateral electric field mode comprises a pixel electrode and a common electrode formed on one of substrates.

For example, technology by which each of the pixel electrode and the common electrode comprises a plurality of strip electrodes extending in the same direction, the strip electrodes of the pixel electrode and the strip electrodes of the common electrode are arranged alternately, the strip electrodes of the common electrode superposed on a drain signal line are formed to be wider than other strip electrodes, and distances between adjacent strip electrodes are partially different from each other, is known.

DETAILED DESCRIPTION

In general, according to one embodiment, a liquid crystal display device, include: a first substrate comprising a first pixel electrode which comprises m first strip electrodes aligned in a first direction, a second pixel electrode which comprises m second strip electrodes aligned in the first direction and which is adjacent to the first pixel electrode in the first direction, a third pixel electrode which comprises n third strip electrodes aligned in the first direction and which is adjacent to the second pixel electrode in the first direction, a fourth pixel electrode which comprises m fourth strip electrodes aligned in the first direction and which is adjacent to the first pixel electrode in a second direction, a fifth pixel electrode which comprises m fifth strip electrodes aligned in the first direction and which is adjacent to the second pixel electrode in the second direction, and a sixth pixel electrode which comprises n sixth strip electrodes aligned in the first direction and which is adjacent to the third pixel electrode in the second direction, m and n being positive integers and unequal to each other; a second substrate comprising a first color filter opposed to the first pixel electrode and the fourth pixel electrode, a second color filter opposed to the second pixel electrode and the fifth pixel electrode, a third color filter opposed to the third pixel electrode, and a fourth color filter opposed to the sixth pixel electrode; and a liquid crystal layer held between the first substrate and the second substrate.

According to another embodiment, a liquid crystal display device, include: a first substrate comprising a first pixel electrode which comprises m first strip electrodes aligned in a first direction, a second pixel electrode which comprises n second strip electrodes aligned in the first direction and which is adjacent to the first pixel electrode in the first direction, and a source line located between the first pixel electrode and the second pixel electrode, m and n being positive integers, m being smaller than n, a first distance in the first direction between the first pixel electrode and the source line being greater than a second distance in the first direction between the second pixel electrode and the source line; a second substrate comprising a first color filter opposed to the first pixel electrode and a second color filter opposed to the second pixel electrode; and a liquid crystal layer held between the first substrate and the second substrate.

Embodiments will be described hereinafter with reference to the accompanying drawings. In the drawings, constituent elements having like or similar functions are denoted by the same reference numbers or symbols, and their duplicated explanations are omitted.

Figure 1:
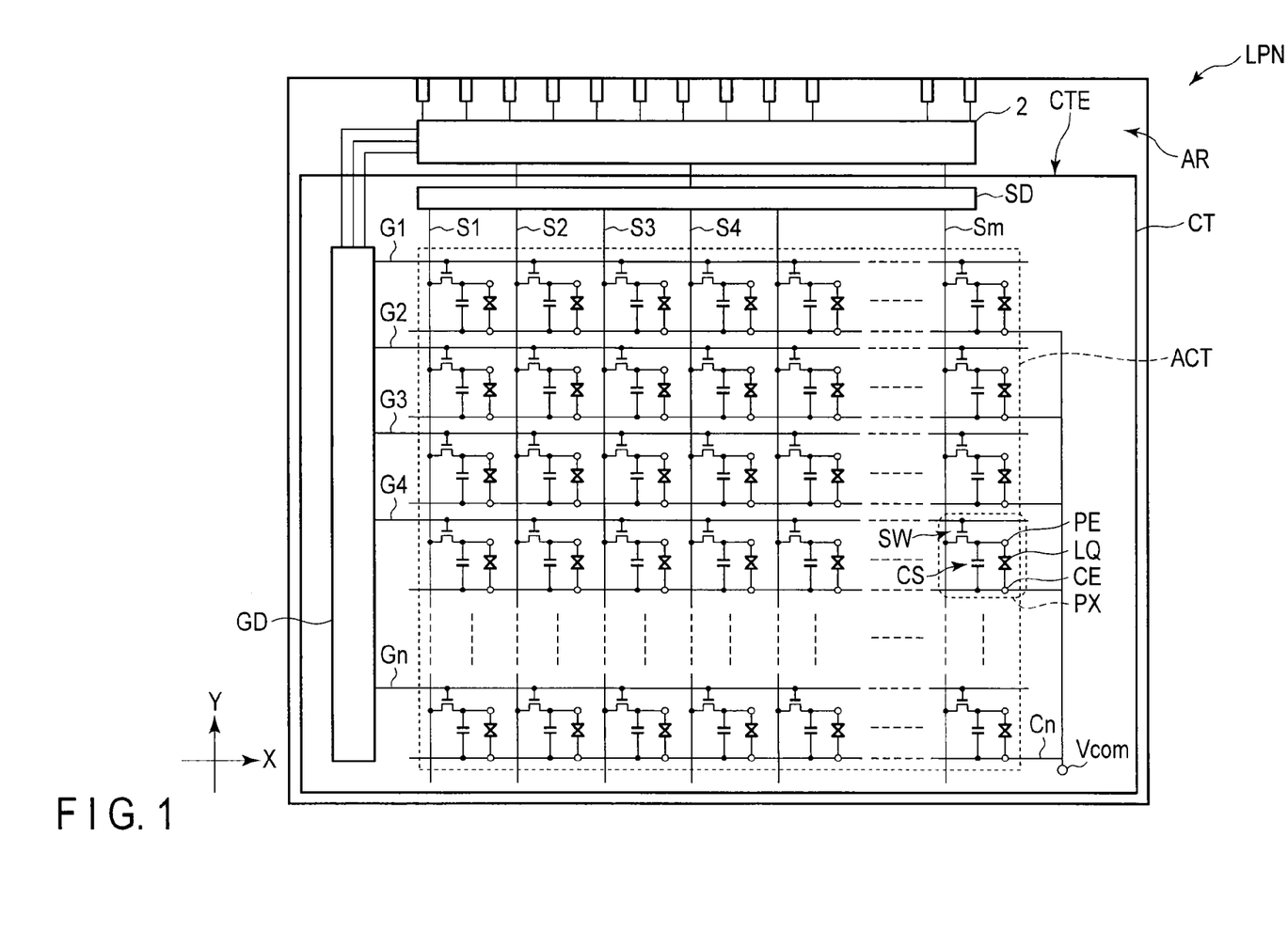
FIG. 1 is a view schematically showing a structure and an equivalent circuit, of a liquid crystal display panel LPN which constitutes a display device of embodiments.

FIG. 1 is a view schematically showing a structure and an equivalent circuit, of a liquid crystal display panel LPN which constitutes a liquid crystal display device of the embodiments.

More specifically, the liquid crystal display device comprises an active-matrix-type liquid crystal display panel LPN. The liquid crystal display panel LPN comprises an array substrate AR which is a first substrate, a counter-substrate CT which is a second substrate disposed to be opposed to the array substrate AR, and a liquid crystal layer LQ held between the array substrate AR and the counter-substrate CT. The liquid crystal display panel LPN includes an active area ACT where an image is displayed. The active area ACT corresponds to a region where the liquid crystal layer LQ is held between the array substrate AR and the counter-substrate CT, has a rectangular shape, for example, and is composed of a plurality of pixels PX arrayed in a matrix.

The array substrate AR includes, in the active area ACT, gate lines G (G1 to Gn), source lines S (S1 to Sm), a switching element SW, a pixel electrode PE, a common electrode CE, etc. The gate lines G (G1 to Gn) extend in a first direction X and align in a second direction Y crossing the first direction X. The source lines S (S1 to Sm) substantially extend in the second direction Y and align in the first direction X. More strictly, the source lines S are curved in accordance with a pixel layout or a pixel shape as explained below. The switching element SW is electrically connected to the gate line G and the source line S in each pixel PX. The pixel electrode PE is formed in an island shape in each pixel PX, and is electrically connected to the switching element SW. The common electrode CE forms a plane facing all of pixels PX and is opposed to the pixel electrode PE, in the active area ACT. A storage capacitor CS is formed, for example, between the common electrode CE and the pixel electrode PE.

Each of the gate lines G is led to the outside of the active area ACT and is connected to a first driving circuit GD. Each of the source lines S is led to the outside of the active area ACT and is connected to a second driving circuit SD. At least parts of the first driving circuit GD and second driving circuit SD are formed on, for example, the array substrate AR, and are connected to a driving IC chip 2. The driving IC chip 2 incorporates a controller which controls the first driving circuit GD and the second driving circuit SD, and functions as a signal supply source for supplying signals necessary for driving the liquid crystal display panel LPN. In the example illustrated, the driving IC chip 2 is mounted on the array substrate AR, on the outside of the active area ACT. The common electrode CE is led out to the outside of the active area ACT and is connected to a power supply module Vcom. The power supply module Vcom supplies a common potential to the common electrode CE.

Figure 2:
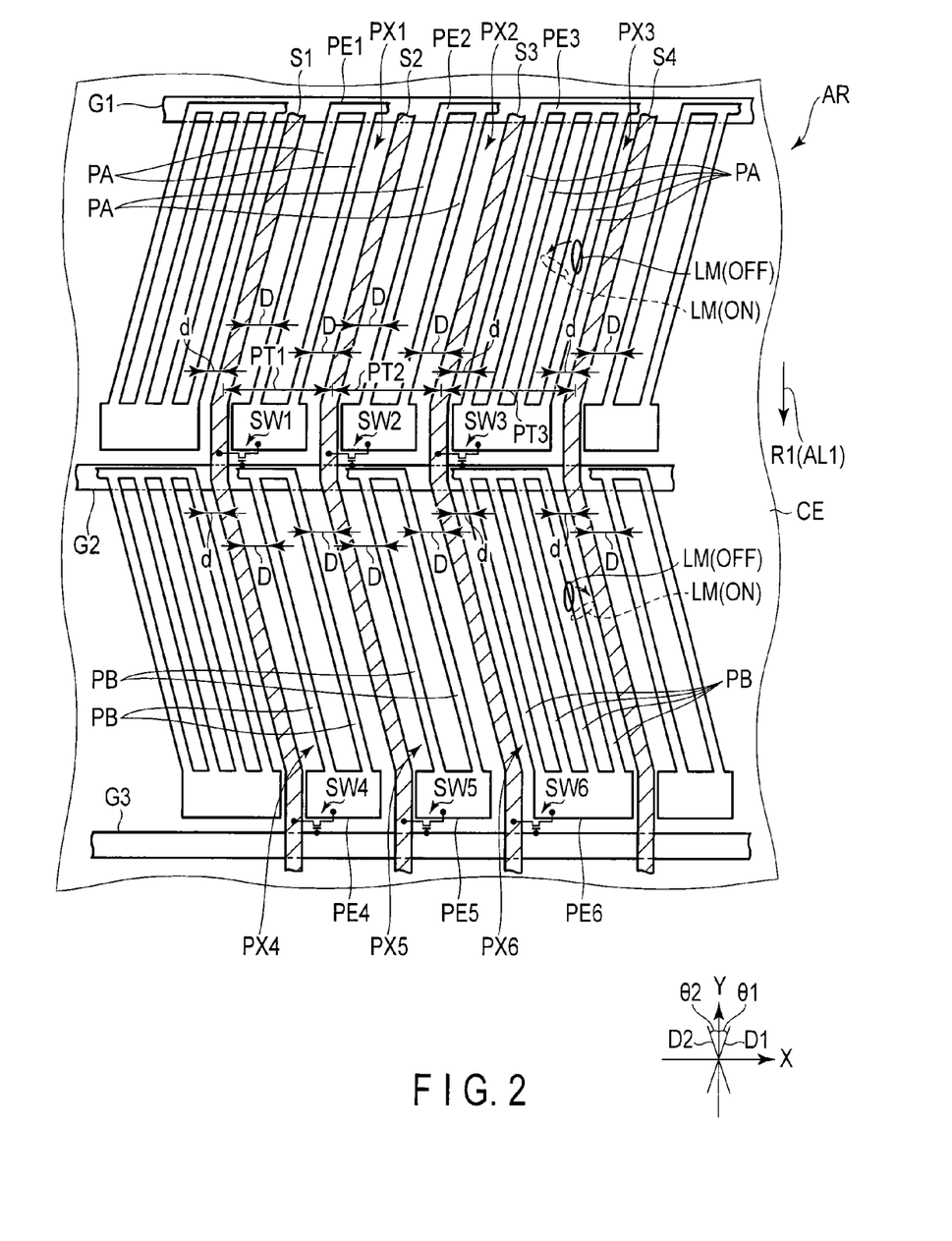
FIG. 2 is a schematic plan view showing a first structure example of pixels in an array substrate AR shown in FIG. 1 as seen from a counter-substrate side.

FIG. 2 is a schematic plan view showing a first structure example of the pixels in the array substrate AR shown in FIG. 1 as seen from a counter-substrate side. A pixel structure to which the FFS mode is applied is exemplified, and main portions necessary for explanations alone are illustrated in the drawing.

The array substrate AR comprises gate lines G1 to G3, source lines S1 to S4, switching elements SW1 to SW6, the common electrode CE, pixel electrodes PE1 to PE6, a first alignment film AL1, etc.

Each of the gate lines G1 to G3 extends in the first direction X. Each of the source lines S1 to S4 substantially extends in the second direction Y and crosses the gate lines G1 to G3. Pixels PX1 to PX6 are sectioned by the gate lines G1 to G3 and the source lines S1 to S4.

The pixels PX1 to PX3 aligned in the first direction X are color pixels of different colors, and the pixels PX4 to PX6 aligned in the first direction X are also color pixels of different colors. The pixels PX1 and PX4 aligned in the second direction Y are pixels of the same color and, for example, red (R) pixels. The pixels PX2 and PX5 aligned in the second direction Y are pixels of the same color and, for example, green (G) pixels. The pixels PX3 and PX6 aligned in the second direction Y are pixels of different colors and, for example, the pixel PX3 is a white (W) pixel and the pixel PX6 is a blue (B) pixel.

The pixel PX1 is defined by the gate line G1, the gate line G2, the source line S1 and the source S2. The pixel PX2 is defined by the gate line G1, the gate line G2, the source line S2 and the source S3. The pixel PX3 is defined by the gate line G1, the gate line G2, the source line S3 and the source S4. The pixels PX1 to PX3 extend in a first extending direction D1 that crosses the second direction Y clockwise at an acute angle. Each of the source lines S1 to S4 located on both sides of the pixels PX1 to PX3 extends in the first extending direction D1.

The pixel PX4 is defined by the gate line G2, the gate line G3, the source line S1 and the source S2. The pixel PX5 is defined by the gate line G2, the gate line G3, the source line S2 and the source S3. The pixel PX6 is defined by the gate line G2, the gate line G3, the source line S3 and the source S4. The pixels PX4 to PX6 extend in a second extending direction D2 that crosses the second direction Y anticlockwise at an acute angle. Each of the source lines S1 to S4 located on both sides of the pixels PX4 to PX6 extends in the second extending direction D2. An angle θ1 made between the second direction Y and the first extending direction D1 is substantially the same as an angle θ2 made between the second direction Y and the second extending direction D2.

The common electrode CE extends over a substantially entire region of the array substrate AR and is formed commonly to the pixels PX1 to PX6. In other words, the common electrode CE extends in the second direction Y over the gate lines G1 to G3, extends in the first direction X over the source lines S1 to S4, and is arranged in each of the pixels PX1 to PX6. In the common electrode CE, an opening portion for electric connection between the pixel electrode and the switching element is formed at each element though not described in detail.

The pixel PX1 comprises the switching element SW1 and the pixel electrode PEI. The switching element SW1 is electrically connected with the gate line G2 and the source line Sl. The pixel electrode PE1 is located between the source line S1 and the source line S2, and is connected to the switching element SW1.

The pixel PX2 comprises the switching element SW2 and the pixel electrode PE2. The switching element SW2 is electrically connected with the gate line G2 and the source line S2. The pixel electrode PE2 is located between the source line S2 and the source line S3, and is connected to the switching element SW2.

The pixel PX3 comprises the switching element SW3 and the pixel electrode PE3. The switching element SW3 is electrically connected with the gate line G2 and the source line S3. The pixel electrode PE3 is located between the source line S3 and the source line S4, and is connected to the switching element SW3.

Similarly, the pixel PX4 comprises the switching element SW4 electrically connected with the gate line G3 and the source line S1, and the pixel electrode PE4 connected to the switching element SW4. The pixel PX5 comprises the switching element SW5 electrically connected with the gate line G3 and the source line S2, and the pixel electrode PE5 connected to the switching element SW5. The pixel PX6 comprises the switching element SW6 electrically connected with the gate line G3 and the source line S3, and the pixel electrode PE6 connected to the switching element SW6.

Each of the switching elements SW1 to SW6 is, for example, a thin-film transistor (TFT). Each of the pixel electrodes PE1 to PE6 is opposed to the common electrode CE.

Each of the pixel electrodes PE1 to PE3 is formed in an island shape corresponding to the pixel shape extending in the first extending direction D1. In addition, each of the pixel electrodes PE1 to PE3 includes at least one strip electrode PA. The strip electrode PA extends in the first extending direction D1. In the example illustrated, each of the pixel electrodes PE1 to PE3 includes a plurality of strip electrodes PA aligned in the first direction X.

Each of the pixel electrodes PE4 to PE6 is formed in an island shape corresponding to the pixel shape extending in the second extending direction D2. In addition, each of the pixel electrodes PE4 to PE6 includes at least one strip electrode PB. The strip electrode PB extends in the second extending direction D2. In the example illustrated, each of the pixel electrodes PE4 to PE6 includes a plurality of strip electrodes PB aligned in the first direction X.

Each of the pixel electrode PE1, the pixel electrode PE2 comprises m strip electrodes PA. Each of the pixel electrode PE4, and the pixel electrode PE5 comprises m strip electrodes PB. In contrast, the pixel electrode PE3 and the pixel comprises n strip electrodes PA. The pixel electrode PE6 and the pixel comprises n strip electrodes PB. The number m and the number n are positive integers, and m is unequal to n. In the example illustrated, m is smaller than n, and m=2 and n=4.

In other words, each of the pixel electrode PE1, the pixel electrode PE2, the pixel electrode PE4, and the pixel electrode PE5 includes number (m−1) of slits extending along the first extending direction D1. Each of the pixel electrode PE3 and the pixel electrode PE6 includes number (n−1) of slits extending along the second extending direction D2. The slits are opposed to the common electrode CE.

The first alignment film AL1 is subjected to alignment treatment along a direction crossing a major axis of the strip electrode PA (i.e., the first extending direction D1 in the example shown in FIG. 2) and a major axis of the strip electrode PB (i.e., the second extending direction D2 in the example shown in FIG. 2) at an acute angle equal to or smaller than 45°. An alignment direction R1 of the first alignment film AL1 is a direction which is parallel to the second direction Y and which crosses the first extending direction D1 or the second extending direction D2.

The pixels PX1 to PX3 are noted here. A pitch PT1 between the source line S1 and the source line S2 is substantially equal to a pitch PT2 between the source line S2 and the source line S3. A pitch PT3 between the source line S3 and the source line S4 is longer than the pitch PT1 and the pitch PT2. Widths in the first direction X of the pixel electrode PE1 and the pixel electrode PE2 are substantially equal to each other and are smaller than a width in the first direction X of the pixel electrode PE3. The strip electrodes PA of the pixel electrode PE1 and the pixel electrode PE2 have substantially equal widths in the first direction X, and distances between the adjacent strip electrodes PA in the pixel electrode PE1 and the pixel electrode PE2 are equal to each other and are arranged at equal pitches. The strip electrodes PA of the pixel electrode PE3 have substantially equal widths in the first direction X and are arranged at equal pitches, but are smaller in width than the strip electrodes PA of the pixel electrode PE1 and the pixel electrode PE2. In addition, a distance (slit width) between the adjacent strip electrodes PA of the pixel electrode PE3 is shorter than a distance (slit width) between the adjacent strip electrodes PA of the pixel electrode PE1 and the pixel electrode PE2, and the strip electrodes PA of the pixel electrode PE3 are arranged at narrow pitches.

In the pixel electrode PE1, a distance D in the first direction X is set between the strip electrode PA on the one-end side and the source line S1, and between the strip electrode PA on the other end side and the source line S2. In the pixel electrode PE2, a distance D in the first direction X is set between the strip electrode PA on the one-end side and the source line S2, and between the strip electrode PA on the other end side and the source line S3. In the pixel electrode PE3, a distance d in the first direction X is set between the strip electrode PA on the one-end side and the source line S3, and between the strip electrode PA on the other end side and the source line S4. The distance d is shorter than the distance D.

The pixels PX4 to PX6 have the same relationship as the above-described relationship in the pixels PX1 to PX3.

Figure 3:
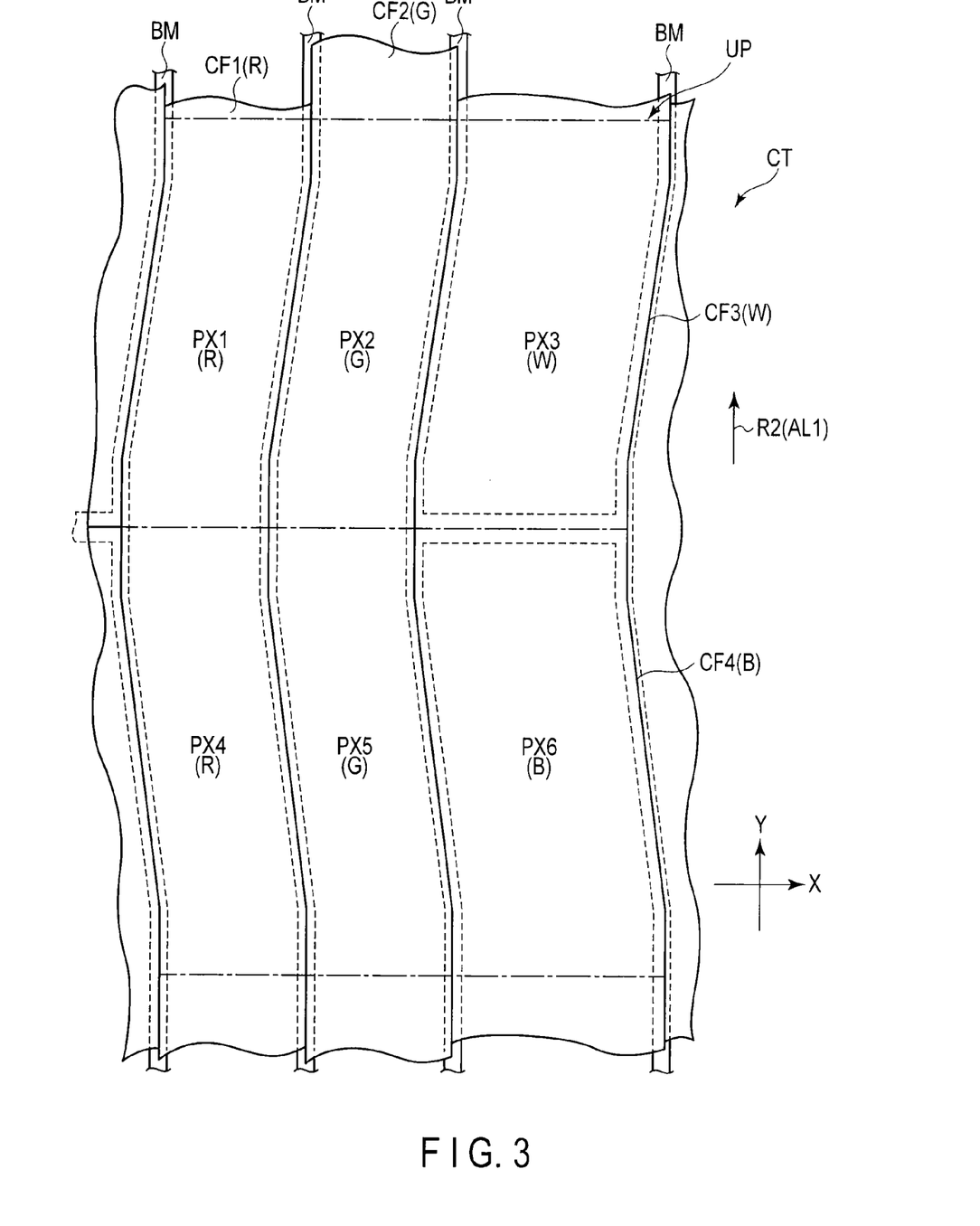
FIG. 3 is a plan view schematically showing an example of a layout of each pixel and color filters in the embodiments.

FIG. 3 is a plan view schematically showing an example of a layout of the pixels and color filters in the embodiments.

A unit pixel for realizing color display is composed of a plurality of different color pixels. The unit pixel is a minimum unit which constitutes a color image displayed on the active area. The unit pixel UP is composed of six color pixels. The unit pixel UP is composed of a pixel (first color pixel) PX1, a pixel (second color pixel) PX2, a pixel (third color pixel) PX3, a pixel (fourth color pixel) PX4, a pixel (fifth color pixel) PX5 and a pixel (sixth color pixel) PX6. In the drawing, each pixel is indicated by a one-dot-chained line. The pixel PX2 is a pixel of a color different from the color of the pixel PX1 and is adjacent to the pixel PX1 in the first direction X. The pixel PX3 is a pixel of a color different from the colors of the pixel PX1 and the pixel PX2, and is adjacent to the pixel PX2 in the first direction X. The pixel PX4 is a pixel of the same color as the pixel PX1 and is adjacent to the pixel PX1 in the second direction Y. The pixel PX5 is a pixel of the same color as the pixel PX2 and is adjacent to the pixel PX2 in the second direction Y. The pixel PX6 is a pixel of a color different from the colors of the pixel PX1, pixel PX2 and pixel PX3, and is adjacent to the pixel PX3 in the second direction Y. The pixel PX1 and the pixel PX4 are red pixels, the pixel PX2 and the pixel PX5 are green pixels, the pixel PX3 is a blue pixel, and the pixel PX6 is a white pixel. In this structure, the pixel PX1, the pixel PX2, the pixel PX4 and the pixel PX5 are substantially equal in area. The area of each of the pixel PX3 and the pixel PX6 is larger than the area of the pixel PX1, etc.

The counter-substrate CT comprises light-shield layers BM, color filters CF1 to CF4, a second alignment film AL2, etc.

The light-shield layers BM are disposed at boundaries of the respective pixels. In other words, the light-shield layers BM are located above the source lines and the gate lines shown in FIG. 2. The light-shield layer BM is not disposed at a boundary between the pixels of the same color, but disposed at a boundary between the pixels of different colors. In other words, the light-shield layer BM is not disposed at a boundary between the pixel PX1 and the pixel PX4 or between the pixel PX2 and the pixel PX5, but disposed at a boundary between the pixel PX3 and the pixel PX6.

A color filter (first color filter) CF1 is formed in a strip shape extending in the second direction Y. A color filter (second color filter) CF2 is adjacent to the color filter CF1 in the first direction X, and is formed in a strip shape extending in the second direction Y. A color filter (third color filter) CF3 is adjacent to the color filter CF2 in the first direction X, and is formed in an island shape. A color filter (fourth color filter) CF4 is adjacent to the color filter CF3 in the second direction Y, and is adjacent to the color filter CF2 in the first direction X and is formed in an island shape. The color filter CF3 and the color filter CF4 are alternately disposed in the second direction Y.

The color filter CF1 is disposed to correspond to the pixel PX1 and the pixel PX4. The color filter CF2 is disposed to correspond to the pixel PX2 and the pixel PX5. The color filter CF3 is disposed to correspond to the pixel PX3. The color filter CF4 is disposed to correspond to the pixel PX6. In the example illustrated, the color filter CF1 is a red (R) color filter, the color filter CF2 is a green (G) color filter, the color filter CF3 is a white (W) color filter, and the color filter CF4 is a blue (B) color filter. The color filters CF1 to CF4 have mutually adjacent end portions overlapping the light-shield layers BM.

Thus, the active area includes the color pixels of four colors (red pixels, green pixels, blue pixel, and white pixel), and the number of color pixels of two colors (blue pixels and white pixels, in the example illustrated), of the four colors, is half the number of color pixels of the other two colors (red pixels and green pixels, in the example illustrated). In general, the sum of the areas of the pixel PX1 and the pixel PX4, which are the red pixels, is equal to the sum of the areas of the pixel PX2 and the pixel PX5, which are the green pixels, and is equal to or smaller than the area of the pixel PX3 which is the white pixel or the area of the pixel PX6 which is the blue pixel.

The second alignment film AL2 is subjected to alignment treatment along a direction parallel to the alignment direction R1 of the first alignment film AL1. An alignment direction R2 of the second alignment film AL2 is, for example, mutually opposed to the alignment direction R1 of the first alignment film AL1.

Figure 4:
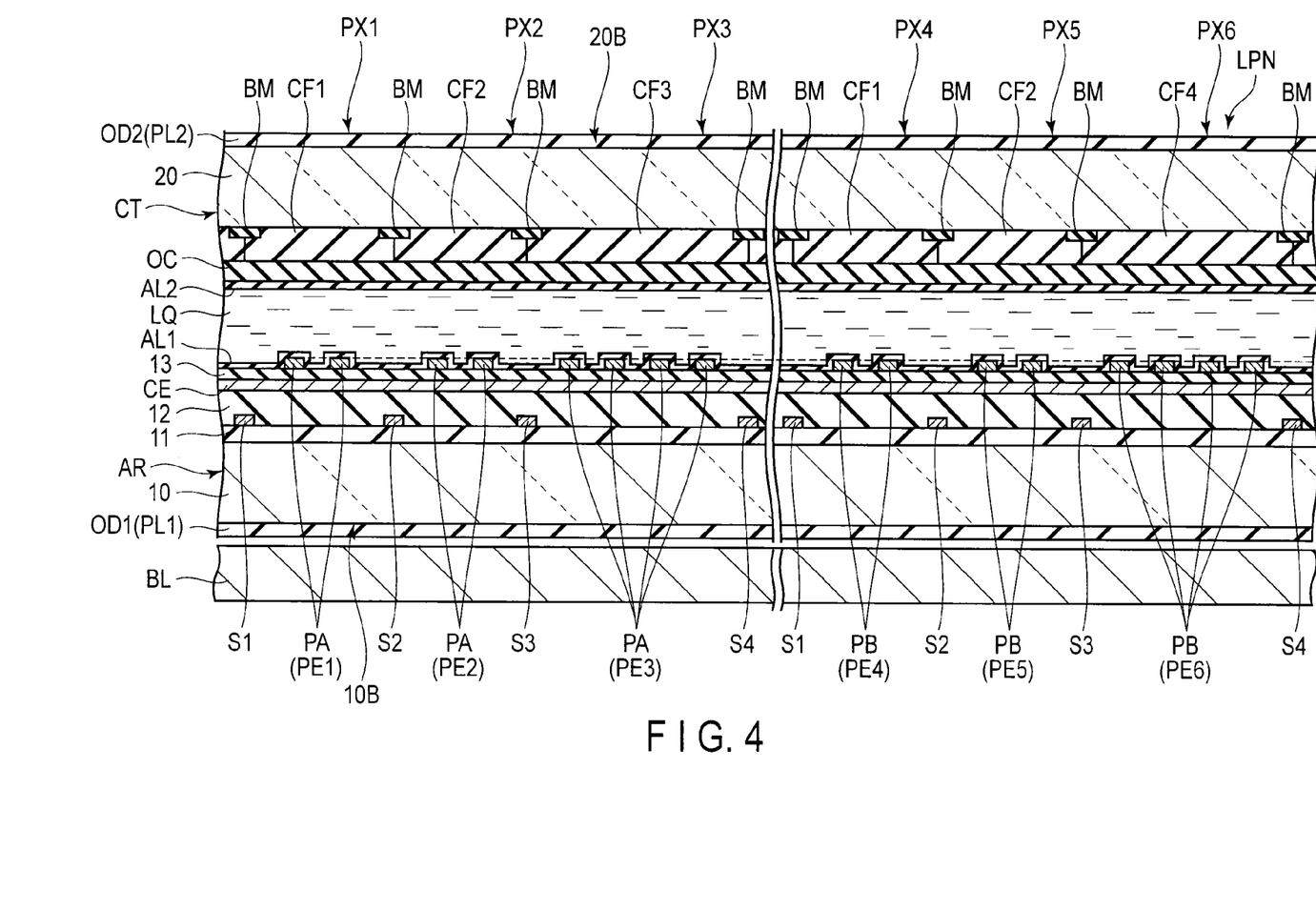
FIG. 4 is a cross-sectional view schematically showing a structure of the crystal display panel LPN including pixels PX1 to PX6 shown in FIG. 2.

FIG. 4 is a cross-sectional view schematically showing the structure of the liquid crystal display panel LPN comprising the pixels PX1 to PX6 shown in FIG. 2.

The array substrate AR is formed by using a first insulating substrate 10 having light transmissivity, such as a glass substrate or a resin substrate. The array substrate AR comprises the source lines S1 to S4, the common electrode CE, the pixel electrodes PE1 to PE6, a first insulating film 11, a second insulating film 12, a third insulating film 13, the first alignment film AL1, etc. besides the switching elements and the gate lines (not shown), on a side of the first insulating substrate 10 opposed to the counter-substrate CT.

The source lines S1 to S4 are formed on the first insulating film 11 and is covered with the second insulating film 12. The gate lines are formed between the first insulating substrate 10 and the first insulating film 11. The common electrode CE is formed on the second insulating film 12 and is covered with the third insulating film 13. The common electrode CE is formed of a transparent conductive material, for example, indium tin oxide (ITO), indium zinc oxide (IZO), etc.

The pixel electrodes PE1 to PE6 are formed on the third insulating film 13 and are opposed to the common electrode CE. In other words, the strip electrode PA of each of the pixel electrodes PE1 to PE3 and the strip electrode PB of each of the pixel electrodes PE4 to PE6 are located above the common electrode CE with the third insulating film 13 inbetween. The third insulating film 13 is regarded as an interlayer insulating film which is provided between the common electrode CE and the pixel electrodes PE1 to PE6. The pixel electrode PE1 and the pixel electrode PE4 are located between the source line S1 and the source line S2. The pixel electrode PE2 and the pixel electrode PE5 are located between the source line S2 and the source line S3. The pixel electrode PE3 and the pixel electrode PE6 are located between the source line S3 and the source line S4. Each of the pixel electrodes PE1 to PE6 is formed of a transparent conductive material, for example, ITO, IZO, etc. The pixel electrodes PE1 to PE6 are covered with the first alignment film AL1. The first alignment film AL1 also covers the third insulating film 13. The first alignment film AL1 is formed of a material having horizontal alignment property and is disposed on a surface of the array substrate AR which is in contact with the liquid crystal layer LQ.

In contrast, the counter-substrate CT is formed by using a second transparent insulating substrate 20 such as a glass substrate or a resin substrate. The counter-substrate CT comprises the light-shield layers BM, the color filters CF1 to CF4, an overcoat layer OC, the second alignment film AL2, etc. on a side of the second insulating substrate 20 opposing the array substrate AR.

The light-shield layers BM are formed on an inner surface of the second insulating substrate 20. The light-shield layers BM are located above the source lines S1 to S4, respectively. The light-shield layers BM are formed of a black resin material or a light-shielding metal material.

Each of the color filters CF1 to CF4 is formed on an inner surface of the second insulating substrate 20. The color filter CF1 is opposed to the pixel electrode PE1 and the pixel electrode PE4. The color filter CF2 is opposed to the pixel electrode PE2 and the pixel electrode PE5. The color filter CF3 is opposed to the pixel electrode PE3. The color filter CF4 is opposed to the pixel electrode PE6. The color filter CF1 is formed of a red-colored resin material. The color filter CF2 is formed of a green-colored resin material. The color filter CF3 is formed of a white (or transparent) resin material. The color filter CF4 is formed of a blue-colored resin material. The color filter CF3 may not be disposed, may not be a strictly achromatic color filter, or may be a pale (for example, pale yellow) color filter. Boundaries between the color filters of different colors are disposed at positions overlapping the light-shield layers BM above the source lines S.

The overcoat layer OC covers the color filters CF1 to CF4. The overcoat layer OC flattens unevenness of the surfaces of the color filters CF1 to CF4. The overcoat layer OC is formed of a transparent resin material. The overcoat layer OC is covered with the second alignment film AL2. The first alignment film AL2 is formed of a material having horizontal alignment property and is disposed on a surface of the counter-substrate CT which is in contact with the liquid crystal layer LQ.

The array substrate AR and the counter-substrate CT as explained above are disposed such that the first alignment film AL1 and the second alignment film AL2 face each other. At this time, a predetermined cell gap is formed between the array substrate AR and the counter-substrate CT by a columnar spacer formed on either of the substrates. The array substrate AR and the counter-substrate CT are bonded to each other by a sealing member in a state in which the cell gap is formed. The liquid crystal layer LQ is formed by a liquid crystal material containing the liquid crystal molecules LM sealed in the cell gap between the first alignment film AL1 and the second alignment film AL2.

A backlight unit BL is disposed on a back surface side of the liquid crystal display panel LPN having such a structure. Various types of backlight units can be applied as the backlight unit BL, but explanation of a detailed structure of the backlight unit is omitted.

A first optical element OD1 including a first polarizer PL1 is disposed on an outer surface 10B of the first insulating substrate 10. A second optical element OD2 including a second polarizer PL2 is disposed on an outer surface 20B of the second insulating substrate 20. The first polarizer PL1 and the second polarizer PL2 are disposed to be, for example, in a crossed Nicol positional relationship in which axes of the respective polarizers cross each other at right angles.

Next, the operations of the liquid crystal display device having the above-described structure will be explained.

In an OFF state in which a voltage for forming a potential difference is not applied between the pixel electrode PE and the common electrode CE, the voltage is not applied to the liquid crystal layer LQ and an electric field is not formed between the pixel electrode PE and the common electrode CE. For this reason, the liquid crystal molecules LM included in the liquid crystal layer LQ are initially aligned in an X-Y plane by an alignment restriction force of the first alignment film AL1 and the second alignment film AL2, as illustrated by a solid line in FIG. 2. In other words, the initial alignment direction of the liquid crystal molecules LM is parallel to the second direction Y. In the OFF state, part of light from the backlight unit BL passes through the first polarizer PL1 and is made incident on the liquid crystal display panel LPN. The light incident on the liquid crystal display panel LPN is linearly polarized light orthogonal to, for example, a first absorption axis of the first polarizer PL1. Such a polarized state of the linearly polarized light hardly varies when the light passes through the liquid crystal display panel LPN in the OFF state. For this reason, most part of the linearly polarized light passing through the liquid crystal display panel LPN is absorbed by the second polarizer PL2 (black display).

In contrast, in an ON state in which a voltage for forming a potential difference is applied between the pixel electrode PE and the common electrode CE, the voltage is applied to the liquid crystal layer LQ and the fringing field is formed between the pixel electrode PE and the common electrode CE. For this reason, the liquid crystal molecules LM are aligned in an orientation different from the initial alignment direction in the X-Y plane, as illustrated by a broken line in FIG. 2. In a positive-type liquid crystal material, for example, the liquid crystal molecules LM of the pixel PX3 are rotated counterclockwise to be aligned in a direction approximately parallel to the fringing field, in the X-Y plane, and the liquid crystal molecules LM of the pixel PX6 are rotated clockwise to be aligned in a direction approximately parallel to the fringing field, in the X-Y plane. At this time, the liquid crystal molecules LM become aligned their angle depending on the magnitude of the electric field. In the ON state, linearly polarized light orthogonal to the first absorption axis of the first polarizer PL1 is made incident on the liquid crystal display panel LPN, and the polarized state is varied in accordance with the aligned state of the liquid crystal molecules LM when the light passes through the liquid crystal layer LQ. For this reason, at least part of the linearly polarized light passing through the liquid crystal layer LQ is transmitted through the second polarizer PL2 (white display).

In such a structure, a normally black mode is implemented.

According to the embodiments, the unit pixel UP is composed of six color pixels of 2 rows×3 columns, and the six color pixels are allocated to any one of a red pixel, a green pixel, a blue pixel, and a white pixel. For example, two color pixels in an identical column are allocated as the red pixels, two color pixels in an identical column are allocated as the green pixels, a color pixel of the largest pixel size is allocated as the blue pixel, and a remaining color pixel is allocated as the white pixel. The blue pixel is located in the same column as the white pixel.

For this reason, color pixels of four columns need to be driven in a unit pixel structure in which four color pixels of a red pixel, a green pixel, a blue pixel and a white pixel are arranged in the first direction X but, in the unit pixel configuration of the embodiments, the color pixels of three columns need only to be driven and an increase in power consumption can be suppressed. In addition, since the number of color pixels arranged in the first direction X is three, the limitation of the pitch in the first direction X of color pixels constituting the unit pixel can be relaxed, as compared to the case in which the number of color pixels arranged in the first direction X is four. For this reason, even in a case where the length in the first direction X of the unit pixel is decreased because of a demand for higher fineness, the length in the first direction X of each color pixel can be set with an allowance, as compared to the processing limit.

In contrast, in the unit pixel UP, two red pixels and two green pixels are allocated while one blue pixel and one white pixel are allocated. If each of all the six pixels has an equal area, brightness of the blue pixel is insufficient. For this reason, the area of the blue pixel is increased by making the lengths in the second direction Y of the red pixels, green pixels and the blue pixel equal and by making the length in the first direction X of the blue pixel greater than the length in the first direction X of each of the red pixels and the green pixels. An optimum color balance can be thereby obtained.

At this time, if the length in the first direction X of the blue pixel is substantially double as great as the length in the first direction X of each of the red pixels and the green pixels (i.e., if the pitch PT1 and the pitch PT2 shown in FIG. 2 are equal and the pitch PT3 is double the pitch PT1), the areas of the red pixels, the green pixels and the blue pixel are equal to each other in the unit pixel UP. In this case, a shape modification ratio of the pixel pitches in the unit pixel UP (PT3/PT1) is 2. As the pitches PT1 to PT3 become smaller in accordance with higher fineness and the shape modification ratio becomes higher, the area ratio of the color pixels in the unit pixel UP is greatly varied, which causes an inconvenience that the color balance is broken, when a gap in bonding occurs in the first direction X in the step of bonding the array substrate AR and the counter-substrate CT.

In the embodiments, a layout of setting the pitch PT1 and the PT2 to be about 24 μm, setting the pitch PT3 to be about 30 μm, and suppressing the shape modification ratio to 1.25 is applied as an example. Thus, the variation in the area ratio of the color pixels in the unit pixel UP can be suppressed even if the gap in bonding between the array substrate AR and the counter-substrate CT occurs. In other words, margin at bonding the array substrate AR and the counter-substrate CT in the manufacturing process can be increased. Deterioration in display quality can be therefore suppressed.

At this time, since the pitch PT3 of the blue pixel and the white pitch becomes greater than the pitch PT1 of the red pixels and the pitch PT2 of the green pixels, a layout of varying the number of strip electrodes in accordance with the shape modification of each color pixel is applied, for example, each of the pixel electrodes of the red pixels and the green pixels comprises two trip electrodes, and each of the pixel electrodes of the blue pixel and the white pixel comprises four strip electrodes. The strip electrodes of each color pixel can be arranged widely at substantially equal pitches. For this reason, a high transmittance of each color pixel can be obtained. For the insufficient brightness of the blue pixel caused by suppressing the shape modification ratio to a low level, the color balance can be maintained by lowering a relative transmittance of a red color filter and a green color filter to a blue color filter, adjusting the applied voltage in accordance with an applied voltage—transmittance (V-T) property of each color pixel, and adjusting the area of the transmission region per pixel through which light from the backlight unit is transmitted, by the light-shield layers BM.

In the above-described embodiments, the shape-modified layout in which the pitches of the red pixels and the green pixels are equal and the pitches of the blue pixel and the white pixel are greater than the pitches of the red pixels and the green pixels has been explained, but in the shape-modified layout of different pitches, the color pixels may be combined in a different manner from that mentioned above and all the pitches of the red pixels, green pixels, the blue pixel and white pixel may be different from each other. The pixel electrode arranged in each of the color pixels comprises an arbitrary number of strip electrodes that is set in accordance with each pixel pitch.

In addition, according to the embodiments, the distance in the first direction X between the pixel electrodes and the source lines is set to be long in the red pixels and the green pixels having comparatively narrow pitches, and the distance in the first direction X between the pixel electrodes and the source lines is short in the blue pixel and the white pixel having the pitches wider than the pitches of the red pixels and the green pixels. For this reason, a high transmittance can be obtained even in a vicinity of the source lines and the brightness per pixel can be improved, in the blue pixel and the white pixel. In contrast, in the red pixels and the green pixels, the end portions of the pixel electrodes are provided at positions remote from the source lines and the brightness per pixel is low as compared with the blue pixel and the white pixel.

Figure 5A:
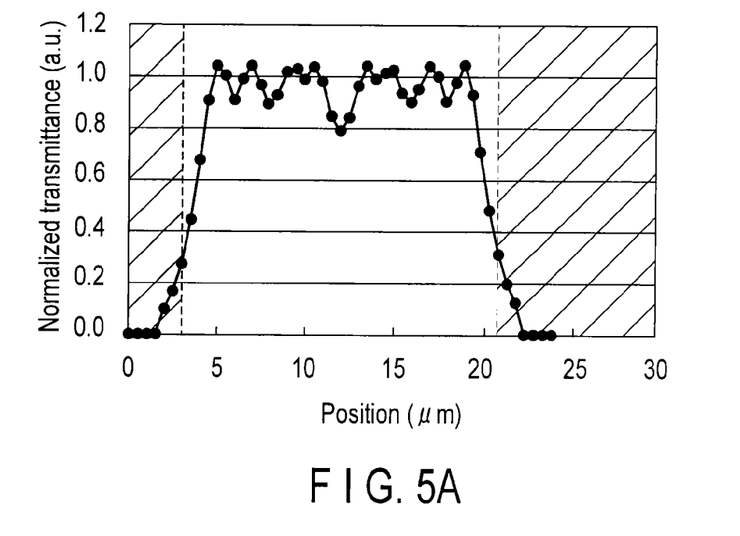
FIGS. 5A and 5B show graphs showing transmittance distributions of color pixels in the layout shown in FIG. 2.
Figure 5B:
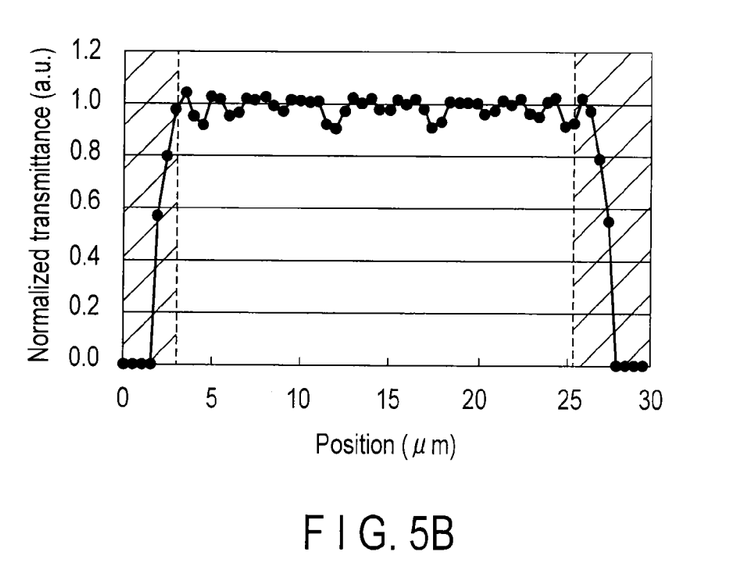

FIG. 5 shows graphs showing distributions of the transmittance of each color pixel in the layout shown in FIG. 2. (A) shows the distribution of the transmittance of the red pixels or the green pixels and (B) shows the distribution of the transmittance of the blue pixel or the white pixel. In each graph, a horizontal axis indicates a position in the first direction X while a vertical axis indicates a normalized transmittance. The transmittance is a value obtained by normalizing a value measured in a state in which no color filters are arranged by setting an average transmittance of the blue pixel or the white pixel as 1. Regions represented by oblique lines are regions overlapping the light-shield layers BM.

In the example shown in (A), a width in the first direction X of two strip electrodes is 3 μm and a distance (slit width) between the strip electrodes is 4.7 μm. The position where the peak transmittance can be obtained at the end portion of each pixel electrode is remote from the position overlapping the light-shield layers BM by several micrometers. In other words, it can be seen that the liquid crystal molecules have a small variation from the initial alignment state and a low transmittance, at the position close to the source lines in the red pixels or the green pixels.

In the example shown in (B), the width in the first direction X of the four strip electrodes is 2.5 μm, and the distance (slit width) of the strip electrodes is 3 μm. The position where the peak transmittance can be obtained at the end portion of the pixel electrode is close to the position overlapping the light-shield layers BM. In other words, it can be seen that in the blue pixel or the white pixel, a high transmittance can be obtained since alignment of the liquid crystal molecules to the vicinity of the source lines is controlled and contributes to the display.

In the embodiments, a layout having the shape modification ratio suppressed to a low level is adopted and, in the unit pixel UP, two color pixels are allocated as the red pixels, two color pixels are allocated as the green pixels, one color pixel is allocated as the blue pixel, and one color pixel is allocated as the white pixel. In addition, the above-described pixel electrode structures are arbitrarily adopted in accordance with the color pixels. The brightness needed to obtain an optimum color balance for each pixel can be thereby obtained.

In addition, as for the red pixels and the green pixels having comparatively narrow pitches, even if the gap in bonding between the array substrate AR and the counter-substrate CT occurs but if the gap width (gap amount) is shorter than the distance between the position where the peak transmittance can be obtained and the position overlapping the light-shield layers BM, the gap in bonding between the substrates gives no influences to the region of the peak transmittance and gives a small influence to the pixel transmittance, since the position where the peak transmittance can be obtained is remote from the position overlapping the light-shield layers BM by several micrometers. The variation in brightness is therefore hardly caused by the gap in bonding. In contrast, the area per pixel in each of the blue pixel and the white pixel is larger than the area per pixel in each of the red pixels and the green pixels, the area influenced by the gap in bonding between the array substrate AR and the counter-substrate CT is small as compared with the area of the entire pixels. The variation in brightness caused by the gap in bonding between the substrates is therefore small in the blue pixel and the white pixel. Thus, in the embodiments, the variation in the area ratio that substantially contributes to display of each color pixel in the unit pixel UP can be suppressed relative to the gap in bonding between the substrates. For this reason, even if the gap in bonding between the array substrate AR and the counter-substrate CT occurs during the manufacturing, an optimum color balance can be maintained.

The red pixel and the green pixel having comparatively narrow pitches are adjacent to each other with the source lines disposed therebetween. In the layout in which a high transmittance can be obtained at the position where each of the color pixels is remote from the source lines even if one of the color pixels is in the ON state and the other is in the OFF state, the liquid crystal molecules LM in the region overlapping the source lines are maintained in the initial alignment state. For this reason, deterioration in display quality caused due to color mixture can be suppressed even when the liquid crystal display panel LPN is observed from an oblique direction. In addition, the red pixels and the green pixels are adjacent to the high-brightness white pixel. Since the liquid crystal molecules LM in the region overlapping the source lines between the color pixels are maintained in the initial alignment state as explained above, the pixels are hardly influenced by the transmitting light which transmits the white pixel and the variation in color hue can be suppressed even when the liquid crystal display panel LPN is observed from an oblique direction.

Next, another structure example will be explained.

Figure 6:
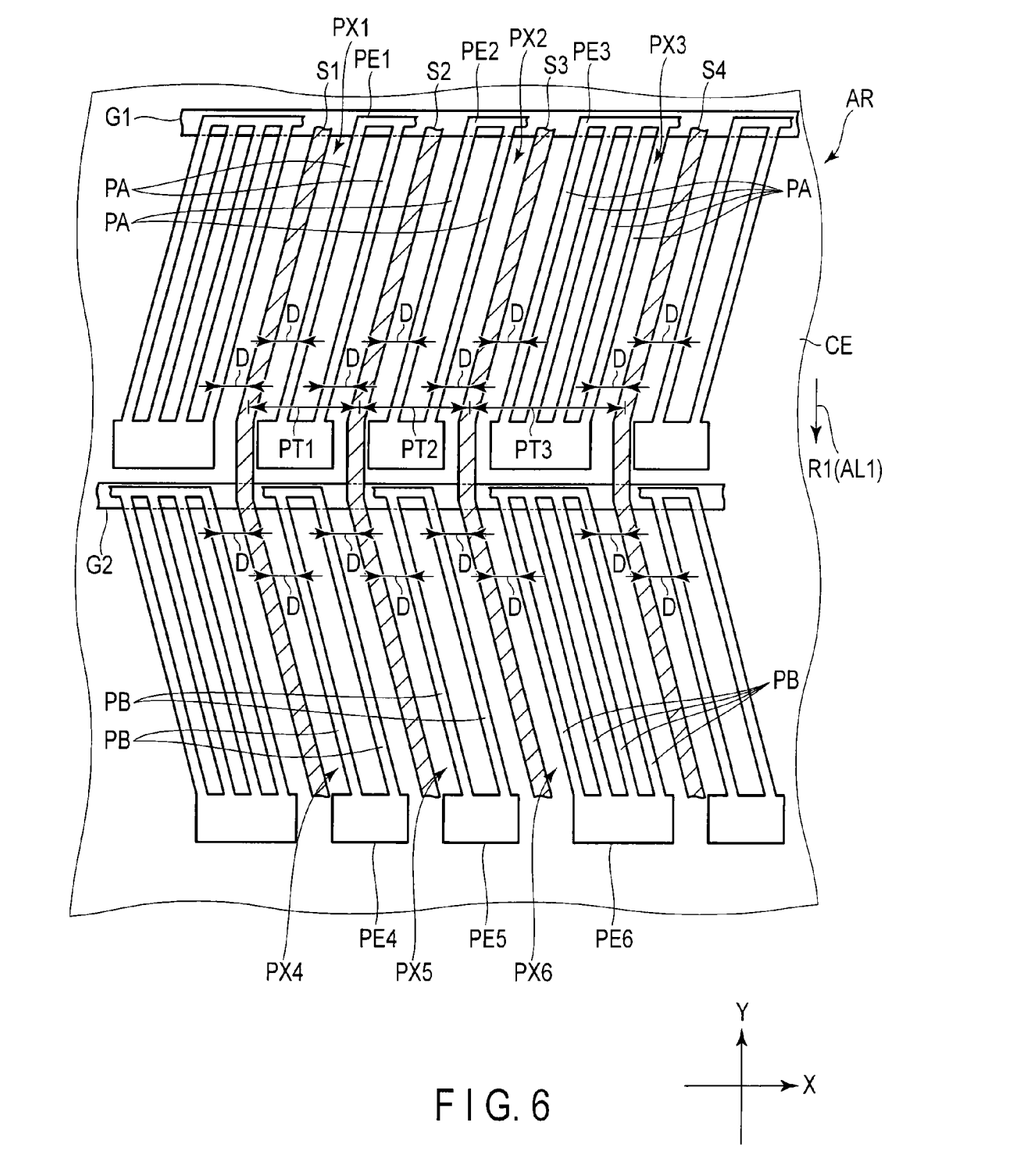
FIG. 6 is a schematic plan view showing a second structure example of pixels in the array substrate AR shown in FIG. 1 as seen from a counter-substrate side.

FIG. 6 is a schematically plan view showing a second structure example of the pixels in the array substrate AR shown in FIG. 1 as seen from the counter-substrate side. In the drawing, the gate lines G, the source lines S, the common electrode CE, and the FFS mode-applied pixel electrodes PE alone are illustrated.

The second structure example shown in the drawing is different from the first structure example shown in FIG. 2 with respect to the point that the distances between all the pixel electrodes and the source lines are equal. The other constituent features are the same as those in the first structure example, and explanations are omitted.

In the example illustrated, each of the pixel electrode PE1 and the pixel electrode PE2 comprises two strip electrodes PA, and each of the pixel electrode PE4 and the pixel electrode PE5 comprises two strip electrodes PB. In contrast, the pixel electrode PE3 comprises four strip electrodes PA, and the pixel electrode PE6 comprises four strip electrodes PB. When the pixels PX1 to PX3 are noted, the pitch PT1 between the source line S1 and the source line S2 is substantially equal to the pitch PT2 between the source line S2 and the source line S3. The pitch PT3 between the source line S3 and the source line S4 is longer than the pitch PT1 and the pitch PT2. The widths in the first direction X of the pixel electrode PE1 and the pixel electrode PE2 are substantially equal to each other and are smaller than the width in the first direction X of the pixel electrode PE3. The strip electrodes PA of the pixel electrode PE1 and the pixel electrode PE2 have substantially equal widths in the first direction X, and are arranged at equal pitches. The strip electrodes PA of the pixel electrode PE3 have substantially equal widths in the first direction X and are arranged at equal distances, but are smaller in width than the strip electrodes PA of the pixel electrode PE1 and the pixel electrode PE2.

In the pixel electrode PE1, a distance D in the first direction X is set between the strip electrode PA on the one-end side and the source line S1, and between the strip electrode PA on the other end side and the source line S2. In the pixel electrode PE2, the distance D in the first direction X is set between the strip electrode PA on the one-end side and the source line S2, and between the strip electrode PA on the other end side and the source line S3. In the pixel electrode PE3, a distance D in the first direction X is set between the strip electrode PA on the one-end side and the source line S3, and between the strip electrode PA on the other end side and the source line S4. The pixels PX4 to PX6 have the same relationship as the relationship among the pixels PX1 to PX3.

In the second structure example, too, a high transmittance can be obtained in the pixel PX3 and the pixel PX6 and an optimum color balance can be obtained by applying a layout in which the shape modification ratio (PT3/PT1) is suppressed to approximately 1.2 to 1.3 to the unit pixel UP. In addition, since the distances D between the pixel electrodes PE1 to PE6 and the source lines S adjacent to the pixel electrodes are set to be comparatively wide, liquid crystal molecules LM in the region overlapping the source lines are maintained in the initial alignment state and, even when the liquid crystal display panel LPN is observed from an oblique direction, deterioration in display quality caused due to color mixture can be suppressed.

Next, another structure example will be explained.

The strip electrodes of each pixel electrode are formed to have a long axis parallel to the first extending direction or the second extending direction in each of the structure examples, but may be formed in a bent shape.

Figure 7:
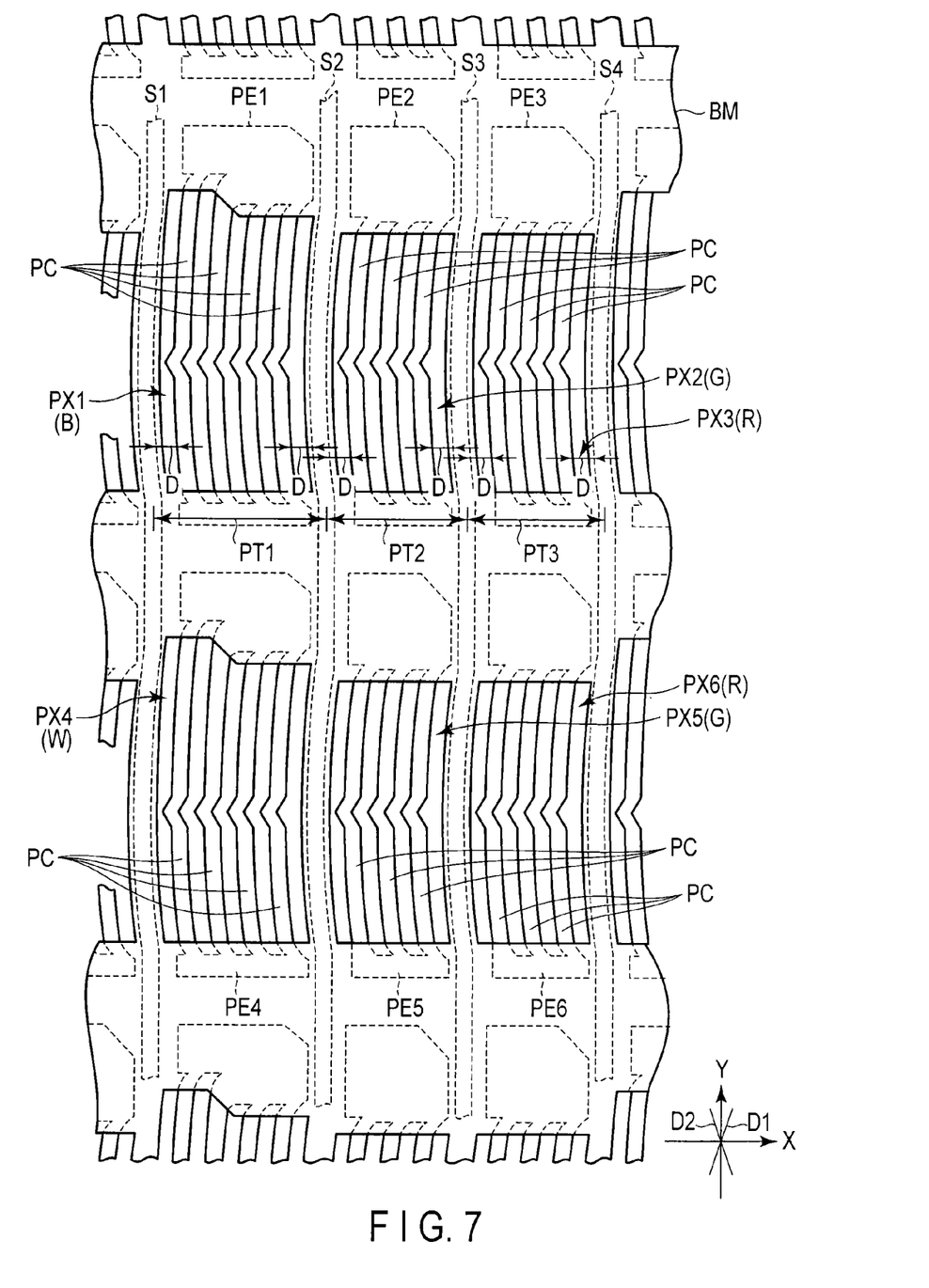
FIG. 7 is a plan view schematically showing a third structure example of pixels.

FIG. 7 is a plan view schematically showing a third structure example of the pixels. The source lines S and the FFS mode-applied pixel electrodes PE on the array substrate side, and the light-shield layers BM on the counter-substrate side are shown.

The third structure example shown in the drawing is different from the second structure example shown in FIG. 6 with respect to the point that all the pixel electrodes comprise strip electrodes bent in a shape of an angle bracket. The other structural features are the same as those of the first structure example, and explanations are omitted.

The pixels PX1 and PX4 are pixels of different colors and, for example, the pixel PX1 is a blue (B) pixel and the pixel PX4 is a white (W) pixel. The pixels PX2 and PX5 are pixels of the same color and, for example, green (G) pixels. The pixels PX3 and PX6 are pixels of the same color and, for example, red (R) pixels.

Each of the pixel electrodes PE1 to PE6 is formed in an island shape corresponding to a bent pixel shape. In other words, each of the pixel electrodes PE1 to PE6 comprises strip electrodes PC. The strip electrodes PC are partially extended along the first extending direction D1 and the second extending direction D2. The plurality of strip electrodes PC are aligned in the first direction X. In the example illustrated, each of the pixel electrode PE1 and the pixel electrode PE4 comprises four strip electrodes PC, and each of the pixel electrode PE2, the pixel electrode PE3, the pixel electrode PE5 and the pixel electrode PE6 comprises three strip electrodes PC.

The pixels PX1 to PX3 are noted here. The pitch PT2 between the source line S2 and the source line S3 is substantially equal to the pitch PT3 between the source line S3 and the source line S4. The pitch PT1 between the source line S1 and the source line S2 is longer than the pitch PT2 and the pitch PT3. The widths in the first direction X of the pixel electrode PE2 and the pixel electrode PE3 are substantially equal to each other and are smaller than the width in the first direction X of the pixel electrode PE1. The strip electrodes PC of the pixel electrode PE2 and the pixel electrode PE2 have substantially equal widths in the first direction X, and are arranged at equal pitches. The strip electrodes PC of the pixel electrode PE1 have substantially equal widths in the first direction X, and are arranged at equal pitches.

In the pixel electrode PE1, a distance D in the first direction X is set between the strip electrode PC on the one-end side and the source line S1, and between the strip electrode PC on the other end side and the source line S2. In the pixel electrode PE2, the distance D in the first direction X is set between the strip electrode PC on the one-end side and the source line S2, and between the strip electrode PC on the other end side and the source line S3. In the pixel electrode PE3, the distance D in the first direction X is set between the strip electrode PC on the one-end side and the source line S3, and between the strip electrode PC on the other end side and the source line S4. In other words, in the example illustrated, the distances between the strip electrodes and the source lines are equal in all the pixel electrodes. In the pixels PX4 to PX6, too, the relationship is the same as that in the pixels PX1 to PX3.

For example, the pitch PT1 is 34 μm and each of the pitch PT2 and the pitch PT3 is 26 μm. The shape modification ratio (PT3/PT1) is 1.3. In addition, the distance D is about 2.5 μm.

In the third structure example, too, the same advantage as that in the second structure example can be obtained.

As described above, the liquid crystal display device capable of suppressing the deterioration in display quality can be provided according to the embodiments.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiment described herein may be made without departing from the spirit of the invention. The accompanying claims and their equivalents are intended to cover such forms or modifications as would fall within the scope and spirit of the inventions.

What is claimed is:

1. A liquid crystal display device, comprising: a first substrate comprising a first pixel electrode which comprises m first strip electrodes aligned in a first direction, a second pixel electrode which comprises m second strip electrodes aligned in the first direction and which is adjacent to the first pixel electrode in the first direction, a third pixel electrode which comprises n third strip electrodes aligned in the first direction and which is adjacent to the second pixel electrode in the first direction, a fourth pixel electrode which comprises m fourth strip electrodes aligned in the first direction and which is adjacent to the first pixel electrode in a second direction, a fifth pixel electrode which comprises m fifth strip electrodes aligned in the first direction and which is adjacent to the second pixel electrode in the second direction, and a sixth pixel electrode which comprises n sixth strip electrodes aligned in the first direction and which is adjacent to the third pixel electrode in the second direction, m and n being positive integers and unequal to each other;

a second substrate comprising a first color filter opposed to the first pixel electrode and the fourth pixel electrode, a second color filter opposed to the second pixel electrode and the fifth pixel electrode, a third color filter opposed to the third pixel electrode, and a fourth color filter opposed to the sixth pixel electrode; and a liquid crystal layer held between the first substrate and the second substrate wherein the first substrate further comprises first to fourth source lines aligned in the first direction, the third source line located between the second pixel electrode and the third pixel electrode, a first distance in the first direction between the second pixel electrode and the third source line is greater than a second distance in the first direction between the third pixel electrode and the third source line, and an interval in the first direction between the adjacent second strip electrodes in the second pixel electrode is greater than an interval in the first direction between the adjacent third strip electrodes in the third pixel electrode.

2. The device of claim 1, wherein m is smaller than n.

3. The device of claim 1, wherein the third source line is located between the fifth pixel electrode and the sixth pixel electrode, and a third distance in the first direction between the fifth pixel electrode and the third source line is greater than a fourth distance in the first direction between the sixth pixel electrode and the third source line.

4. The device of claim 3, wherein the first distance is equal to the third distance, and the second distance is equal to the fourth distance.

5. The device of claim 1, wherein the first substrate further comprises a common electrode and an interlayer insulating film which covers the common electrode, and the first to sixth pixel electrodes are located on the interlayer insulating film and are opposed to the common electrode.

6. The device of claim 1, wherein the third color filter is a white color filter, and the fourth color filter is a blue color filter.

7. The device of claim 6, wherein the first color filter is a red color filter, and the second color filter is a green color filter.

8. The device of claim 1, wherein the first pixel electrode and the fourth pixel electrode are located between the first source line and the second source line, the second pixel electrode and the fifth pixel electrode are located between the second source line and the third source line, the third pixel electrode and the sixth pixel electrode are located between the third source line and the fourth source line, a first pitch between the first source line and the second source line is equal to a second pitch between the second source line and the third source line, and a third pitch between the third source line and the fourth source line is greater than the first pitch and the second pitch.

9. The device of claim 1, wherein the second substrate comprises a light-shield layer in a position overlapping the third source line, a peak transmittance at an end portion of the third pixel electrode close to the third source line is obtained in a position overlapping the light-shield layer, and a peak transmittance at an end portion of the second pixel electrode close to the third source line is obtained in a position not overlapping the light-shield layer.

* * * * *